Feb. 16, 1943.   J. K. LUND   2,310,975
VALVE MECHANISM
Filed Sept. 7, 1940
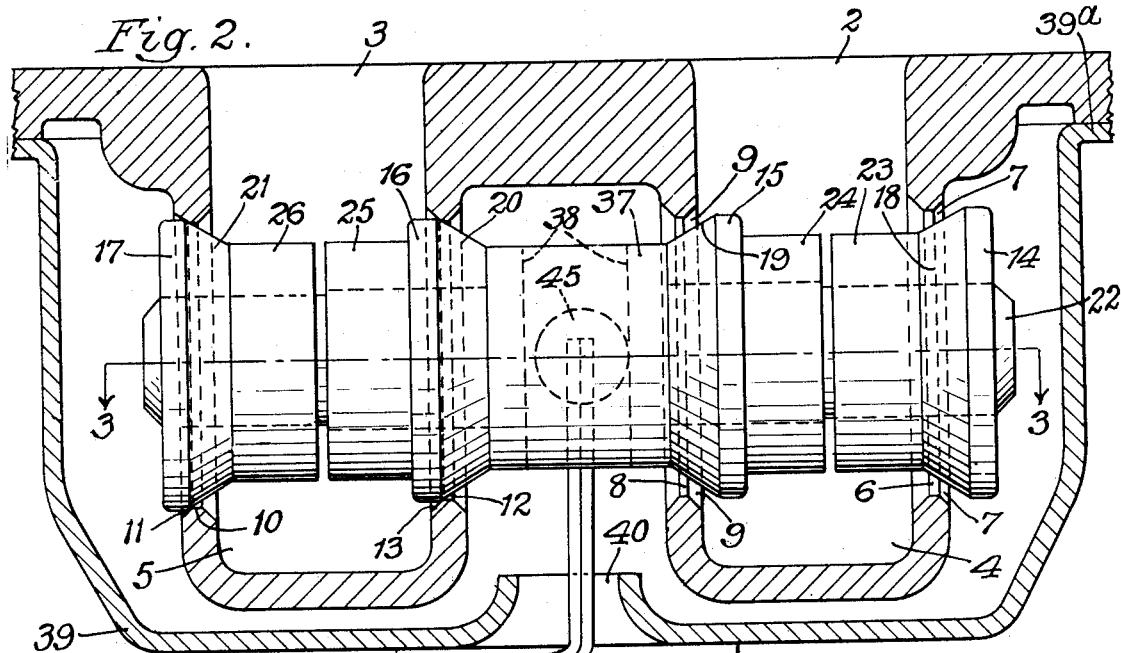
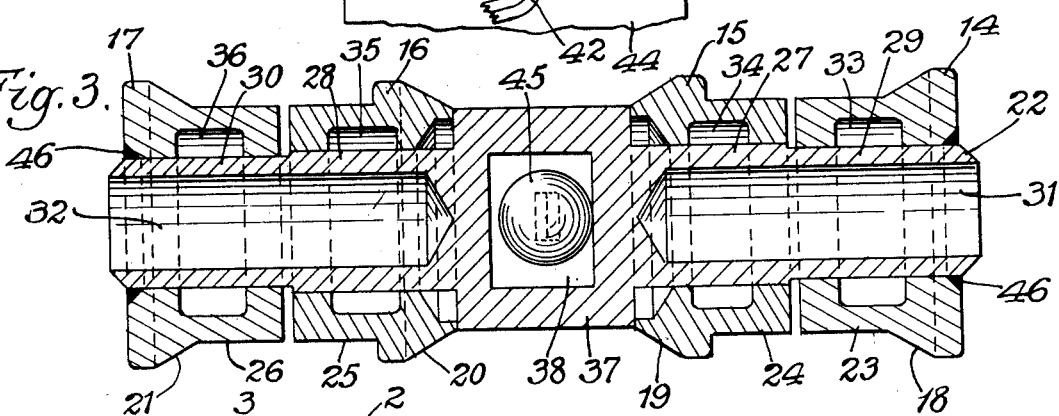
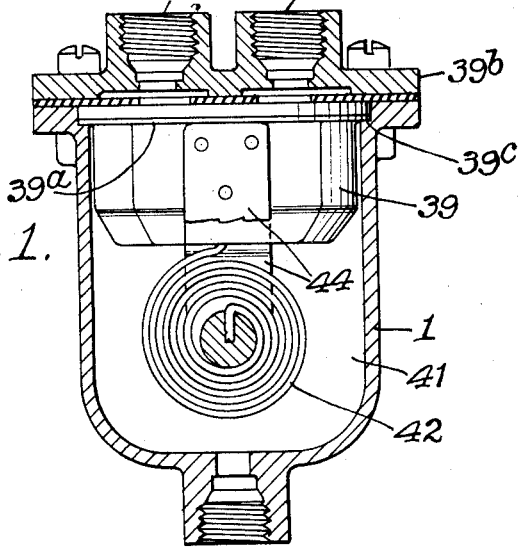
Inventor.
James K. Lund.
by Parker & Carter
Attorneys.

Patented Feb. 16, 1943

2,310,975

UNITED STATES PATENT OFFICE 2,310,975

VALVE MECHANISM

James K. Lund, Oak Park, Ill., assignor to The Dole Valve Company, Chicago, Ill., a corporation of Illinois Application September 7, 1940, Serial No. 355,804

7 Claims. (Cl. 236—12)

This invention relates to valve mechanisms and has for its object to provide a new and improved mechanism of this description.

The invention has as a further object to provide a valve mechanism which shall be floating in the fluid stream. The invention has as a further object to provide a valve mechanism free from bearings. The invention has as a further object to provide a valve mechanism in which the total movement of the valve structure may be limited to a few thousandths of an inch. The invention has as a further object to provide a valve structure particularly adapted for mixing hot and cold liquids. The invention has as a further object to provide a valve structure particularly adapted for mixing hot and cold liquids and arranged to be actuated by a thermostat.

The invention has further objects which are more particularly pointed out in the accompanying description.

Referring now to the drawing, Fig. 1 is a view showing one form of valve mechanism embodying the invention;

Fig. 2 is an enlarged view in part section of the valve structure and its mounting;

Fig. 3 is a sectional view taken on line 3—3 of Fig. 2.

Like numerals refer to like parts throughout the several figures.

In the construction illustrated in the drawing, there is a casing 1 in which the valve structure and its mounting are enclosed. This casing has an inlet 2 for the hot liquid and an inlet 3 for the cold liquid. The inlet 2 discharges into a ported chamber 4 and the inlet 3 discharges into a ported chamber 5. The chamber 4 has an outer port 6 having a beveled face 7 and an inner port 8 having a beveled face 9. The chamber 5 has an outer port 10 having a beveled face 11 and an inner port 12 having a beveled face 13. The outer ports 6 and 10 are larger in diameter than the inner ports 8 and 12. The outer ports 6 and 10 are made larger than the ports 8 and 12 for assembly purposes. As in the construction shown, the inner valves 15 and 16 are inserted through the outer ports during the process of assembling the device. There is a valve member 14 for controlling the port 6, a valve member 15 for controlling the port 8, a valve member 16 for controlling the port 12 and a valve member 17 for controlling the port 10. The valve member 14 has an inclined face 18 cooperating with the inclined face 7 of the port 6. The valve member 15 has an inclined face 19 cooperating with the inclined face 9 of the port 8. The valve member 16 has an inclined face 20 cooperating with the inclined face 13 of the port 12. The valve member 17 has an inclined face 21 cooperating with the inclined face 11 of the port 10. The valve members 14, 15, 16 and 17 are mounted upon a supporting member 22. The valve members have hub portions 23, 24, 25 and 26 which are smaller in diameter than the portions of the valve members which engage the walls of the ports. The portions 27 and 28 of the supporting member 22 for the inner valve members 15 and 16 are somewhat larger in diameter than the portions 29 and 30 of the supporting member 22 upon which the valve members 14 and 17 are mounted.

The supporting member 22 is made exceedingly light, having the hollow portions 31 and 32 at each end. The valve members are also made light by having the hollow portions 33, 34, 35 and 36. The valve structure is made light due to the fact that in operation it is floating in the water stream and is not supported or guided by bearings and has no aligning means. One of the very important features of this invention is that the flowing water alone is the means that suspends the valve structure, with clearance between the valve members and the valve faces, when the device is in operation. The absence of bearings is of vital importance in valve mechanisms which are used where there are high water temperatures, as in mixing valves, for where there are high water temperatures, scale accumulates on the bearings and this interferes with the proper operation of the valve and may cause it to cease operating entirely.

The supporting member 22 is provided intermediate the inner valve members 15 and 16, with an enlargement 37 which is provided with an opening 38 extending therethrough, preferably rectangular in shape. There is preferably a mixing chamber 39 surrounding the valve device into which the hot and cold liquids passing through the ports 6, 8, 10 and 12, are received and thoroughly mixed, the mixed hot and cold liquid being discharged through the discharge opening 40 into the thermostat chamber 41 of the casing 1. The mixing chamber 39 may be of any desired form and supported in any desired manner. As herein shown, it is provided with a lateral flange 39a which fits between the part 39b and shoulder 39c on the casing 1.

Located in the chamber 41 is a thermostat comprising a bimetal coil 42 having one end attached to a shaft 43, which may be supported in any desired manner. As herein shown, this shaft is mounted in the supports 44 which are attached to the mixing chamber 39. The coil 42 is provided at its end with an enlargement 45 which is preferably in the form of a ball and which extends into the opening 38 in the supporting member 22. This enlargement is smaller than the opening so that the enlargement has sufficient clearance on all sides so that the weight of the valve structure is neither held by or pulled down by the end of the bimetal coil 42. It will thus be seen that the thermostat never lifts or lowers the valve members, but only moves them laterally and the construction is such that this lateral movement is merely an indicating movement to make the valve structure responsive to the temperature setting of the thermostat. Due to the fact that the lateral movement of the valve members is exceedingly small, it is easy to center them. The valve assembly is so formed and arranged that it is suspended in the water by the flow or velocity thereof and is further so arranged that the thermostat does not have to counteract or overcome any substantial water pressure or substantial mechanical friction, in moving the valve structure. The valve members are preferably arranged so that there is only a comparatively small opening through the valve port and this insures the high velocity of the liquid passing therethrough, so that it lifts the valve mechanism and holds it out of contact with the walls of the port, holding it suspended in the liquid itself.

The valve members may be assembled in any desired manner on the supporting member 22. As herein shown, the supporting member 22 is placed in position in the ports and the inner valve members 15 and 16 are then pressed on the supporting member until they are the proper distance apart, being held in position by this press fit. The outer valve members 14 and 17 are then placed in position and held in place in any desired manner, as by solder, as shown at 46. When the device is in use the liquid causes the supporting member 22 and the valve members to rock and to move with relation to the ball 45. This tends to clear the parts of any deposit that may form thereon, for such deposit, if retained, would interfere with the close temperature control of the mixed liquid for which this device is used.

In this construction there is means for limiting the size of opening when the ports are opened, so that the liquid flows therethrough with a sufficient velocity to hold or suspend the valve members and connecting parts in the current of water, as hereinbefore set out.

I claim:

1. A valve mechanism comprising a casing having a cold liquid inlet and a hot liquid inlet, separate chambers into which said inlets discharge, each of said chambers having outer and inner ports, each outer port being larger than the associated inner port, a valve device comprising a valve carrying member, four valve members on said valve carrying member for controlling said ports, the ports and valve members having inclined cooperating faces the valves and valve carrying member being loosely mounted in said ports, said valve carrying member and valve members being suspended by the liquid stream when the mechanism is in operation, thereby dispensing with mechanical guides for the valves, and a thermostat for controlling the position of said valve members.

2. A valve mechanism comprising a casing having two inlets, two ports associated with each of said inlets through which liquid passes, four valve members connected together, one associated with each of said ports, for controlling the same, said valves being loosely mounted in said ports so as to be responsive to the upward pressure of the liquid stream thereon so as to be suspended by the liquid stream when the mechanism is in operation, thereby dispensing with mechanical guides for the valves, and a thermostat for controlling the position of said valve members.

3. A valve mechanism comprising a casing having two inlets, two ports associated with each of said inlets through which liquid passes, four valve members, one associated with each of said ports, said valve members being connected together and being loosely mounted in said ports so as to be free to be moved upwardly by the liquid stream passing through the valve mechanism when it is in operation, thereby dispensing with mechanical guides for the valves, and a thermostat for controlling the position of said valve members.

4. A valve mechanism comprising a casing having a cold liquid inlet and a hot liquid inlet, separate chambers into which said inlets discharge, each of said chambers having two opposed ports having surrounding edges, a valve device comprising a supporting member extending through said ports, four valve members on said supporting member for controlling said ports, said valves and supporting member being loosely mounted in said ports so as to be free to be moved upwardly by the liquid stream passing through the device when it is in operation, thereby dispensing with mechanical guides for the valves, said supporting member intermediate said valve members being provided with a hole, a thermostat in said casing comprising a coil having one end connected to a fixed part, the other end of said coil being provided with an enlargement which projects into said hole.

5. A valve mechanism comprising a casing having a cold liquid inlet and a hot liquid inlet, separate chambers into which said inlets discharge, each of said chambers having two opposed ports having surrounding edges, a valve device comprising a valve carrying member, four valves on said valve carrying member for controlling said ports, the surrounding edges of the ports forming the sole support for the valves and the valve carrying member when the device is out of use, thereby dispensing with mechanical guides for the valves.

6. A valve mechanism comprising a casing having a cold liquid inlet and a hot liquid inlet, separate chambers into which said inlets discharge, each of said chambers having two opposed discharge parts, a valve device comprising a valve carrying member, four valve members on said valve carrying member for controlling said ports, said valve carrying member and valve members being loosely mounted in said ports so as to be free to be moved upwardly responsive to the liquid stream flowing through the device when in operation, thereby dispensing with mechanical guides for the valves, and a thermostat for controlling the position of said valve members.

7. A valve mechanism comprising a casing having a cold liquid inlet and a hot liquid inlet, separate chambers into which said inlets discharge, each of said chambers having two opposed discharge parts having continuous edges extending entirely therearound, a valve device comprising a valve carrying member, four valve members on said valve carrying member for controlling said ports, said valve carrying member and valve members being loosely mounted in said ports and supported solely by the surrounding edges of said ports when the device is out of use, said valve members and valve carrying member being free to be moved away from the edges of said ports by the liquid stream passing through the device so as to be suspended by the liquid stream when the mechanism is in operation, thereby dispensing with mechanical guides for the valves, and a thermostat for controlling the position of said valve members.

JAMES K. LUND.